US011321822B2

(12) United States Patent
Xin et al.

(10) Patent No.: US 11,321,822 B2
(45) Date of Patent: May 3, 2022

(54) DETERMINING IMAGE DEFECTS USING IMAGE COMPARISONS

(71) Applicant: INTERNATIONAL BUSINESS MACHINES CORPORATION, Armonk, NY (US)

(72) Inventors: Chao Xin, Ningbo (CN); Zhuo Cai, Beijing (CN); Hong Bing Zhang, Beijing (CN); Dan Zhang, Beijing (CN); Guang Qing Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/947,376

(22) Filed: Jul. 30, 2020

(65) Prior Publication Data
US 2022/0036525 A1 Feb. 3, 2022

(51) Int. Cl.
*G06T 5/50* (2006.01)
*G06T 7/00* (2017.01)
(Continued)

(52) U.S. Cl.
CPC .............. *G06T 5/50* (2013.01); *G06N 7/005* (2013.01); *G06T 7/001* (2013.01); *G06T 7/337* (2017.01);
(Continued)

(58) Field of Classification Search
CPC ........... G06T 5/50; G06T 7/337; G06T 7/001; G06T 2207/20084; G06K 9/6202; G06N 7/005
See application file for complete search history.

(56) References Cited

U.S. PATENT DOCUMENTS

| 5,640,200 A * | 6/1997 | Michael .................. G06T 7/001 348/126 |
| 6,542,830 B1 * | 4/2003 | Mizuno .............. G01R 31/2894 257/E21.525 |

(Continued)

FOREIGN PATENT DOCUMENTS

| CN | 204731167 U | 10/2015 |
| CN | 204789384 U | 11/2015 |

(Continued)

OTHER PUBLICATIONS

Valente, et al., "Print Defect Mapping with Semantic Segmentation", ResearchGate, Jan. 27, 2020, 9 pages, Retrieved from the Internet: <URL: https://www.researchgate.net/publication/338883672>.

(Continued)

*Primary Examiner* — Gregory M Desire
(74) *Attorney, Agent, or Firm* — Elliot J. Shine (57) ABSTRACT

A method, computer system, and a computer program product for analyzing visual defects is provided. The present invention may include generating a template image. The present invention may include capturing a test image. The present invention may include performing an image registration between the template image and the test image. The present invention may include generating a registered test image. The present invention may include performing an image difference analysis between the registered test image and the template image. The present invention may include generating a differential image. The present invention may include synthesizing the registered, differential image, and template image. The present invention may include generating a synthetic image. The present invention may include inputting the synthetic image into a multi-scale detection (Continued)

network. The present invention may include generating a defect map.

19 Claims, 6 Drawing Sheets

(51) Int. Cl.
    *G06N 7/00*            (2006.01)
    *G06T 7/33*            (2017.01)
    *G06V 10/75*          (2022.01)

(52) U.S. Cl.
    CPC .. *G06V 10/751* (2022.01); *G06T 2207/20084* (2013.01)

(56) References Cited

U.S. PATENT DOCUMENTS

| | | | | |
|---|---|---|---|---|
| 8,379,969 | B2* | 2/2013 | Barrois | G01B 11/245 382/154 |
| 10,783,622 | B2* | 9/2020 | Wang | G06T 5/002 |
| 2002/0191831 | A1* | 12/2002 | Spoto | G06T 7/97 382/257 |
| 2007/0226634 | A1* | 9/2007 | Hirai | G06F 8/10 715/744 |
| 2019/0130555 | A1 | 5/2019 | Chang | |
| 2019/0257767 | A1* | 8/2019 | Shaubi | G06F 30/27 |
| 2019/0279074 | A1* | 9/2019 | Lin | G06F 16/583 |
| 2021/0090289 | A1* | 3/2021 | Karanam | G06K 9/6262 |

FOREIGN PATENT DOCUMENTS

| | | |
|---|---|---|
| CN | 205762376 U | 12/2016 |
| CN | 104458755 B | 2/2017 |
| CN | 206648965 U | 11/2017 |
| CN | 206648970 U | 11/2017 |
| CN | 206788056 U | 12/2017 |
| CN | 206818629 U | 12/2017 |
| CN | 109726730 A | 5/2019 |
| CN | 110503644 A | 11/2019 |

OTHER PUBLICATIONS

Ximing, et al., "A rapid defect detecting algorithm for printed matter on the assembly line", 2012 International Conference on Systems and Informatics (ICSAI2012), May 19-20, 2012, 4 pages, IEEE, Retrieved from the Internet: <URL: https://ieeexplore.ieee.org/abstract/document/6223405>.

Yangping, et al., "Real-time Defect Detection Method for Printed Images Based on Grayscale and Gradient Differences", Journal of Engineering Science and Technology Review, Received Aug. 7, 2017, Accepted Jan. 22, 2018, pp. 180-188, Retrieved from the Internet: <URL: https://www.researchgate.net/publication/323893228>.

Zhengwei, et al., "On Image Registration and Defect Detection Techniques in the Print Quality Detection of Cigarette Wrapper", Proceedings of the 27th Chinese Control Conference, Jul. 16-18, 2008, pp. 34-38, Retrieved from the Internet: <URL: https://ieeexplore.ieee.org/abstract/document/4605136>.

* cited by examiner

DETERMINING IMAGE DEFECTS USING IMAGE COMPARISONS

BACKGROUND

The present invention relates generally to the field of computing, and more particularly to image processing systems.

In the printing industry every label has a template image. The template image is a label without defects and the standard by which all subsequent labels are compared. Labels have many uses, including, but not limited to, promotion and providing information on a product's origin, safety warnings, manufacturer (e.g., brand name), use, shelf-life and disposal, many of which are required by law.

Due to the importance of labeling the printing industry places premium importance on quality checks of labels.

SUMMARY

Embodiments of the present invention disclose a method, computer system, and a computer program product for analyzing visual defects. The present invention may include generating a template image. The present invention may include capturing a test image. The present invention may include performing an image registration between the template image and the test image. The present invention may include generating a registered test image. The present invention may include performing an image difference analysis between the registered test image and the template image. The present invention may include generating a differential image. The present invention may include synthesizing the registered, differential image, and template image. The present invention may include generating a synthetic image. The present invention may include inputting the synthetic image into a multi-scale detection network. The present invention may include generating a defect map.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for analyzing visual defects. As such, the present embodiment has the capacity to improve the technical field of analyzing visual defects by learning the false defect detections that are most common, based on past image difference analysis, using a synthetic image as the multi-scale network input, and by mapping and identifying true defect detections by location and type. More specifically, the present invention may include generating a template image. The present invention may include capturing a test image. The present invention may include performing an image registration between the template image and the test image. The present invention may include generating a registered test image. The present invention may include performing an image difference analysis between the registered test image and the template image. The present invention may include generating a differential image. The present invention may include synthesizing the registered, differential, and template image. The present invention may include generating a synthetic image. The present invention may include inputting the synthetic image into a multi-scale detection network. The present invention may include generating a defect map.

As previously described, in the printing industry every label has a template image. The template image is a label without defects and the standard by which all subsequent labels are compared. Labels have many uses, including, but not limited to, promotion and providing information on a product's origin, safety warnings, manufacturer (e.g., brand name), use, shelf-life and disposal, many of which are required by law.

For at least these reasons the printing industry places high importance on quality checks of labels. Cameras are often used to capture the test image and the test image is compared to the template image for defect detection. The test image is the label on the product, packaging or container being examined. Defect detection between the test image and template image often leads to frequent false defect detections due to, at least, low flexibility, instability of image capturing, and low generalization. These false defect detections require additional time and resources in order to be effectively resolved.

Therefore, it may be advantageous to, among other things, orientate the test image in a manner that aligns it with the template image, determine any meaningful difference between the registered test image and template image to generate a differential image, use the registered test image, template image, and differential image to generate a synthetic image, use the synthetic image as the input for a multi-scale detection network, and generate a defect map.

According to at least one embodiment, the present invention may decrease false detections by image registration. Image registration orientates the test image in a manner that aligns it with the template image, generating a registered test image. The registered test image is the test image orientated in a manner consistent with the template image. Frequently when a test image is captured it is orientated in a different manner than the template image because of camera instability. Camera instability may be random, making use of filtering difficult. Often an image difference analysis is performed between the test image and template image, often leading to false defect detections. Image registration of the test image transforms the test image into a manner more consistent with the template image. Image registration utilizes distinct points (e.g., corner features and gradient features) to determine good matching points (e.g., interest points) between the test image and template image.

According to at least one embodiment, the present invention may include performing an image difference analysis between the template image and registered test image. Performing the image difference analysis with the registered test image as opposed to the original test image may reduce the rate of false defect detection. Additionally, if the image difference analysis determines that there is no material difference between the template image and registered test image the image difference process would end. This increases efficiency and allows for more frequent test image analysis.

The image difference analysis also may generate a differential image. The differential image demonstrates a change feature (e.g., differences) between the template image and registered test image. The change feature may include differences attributable to contextual factors (e.g., changes in lighting, color).

According to at least one embodiment, the present invention may synthesize the registered test image, template image, and differential image. The synthesized product is a synthetic image (e.g., multi-channel synthetic image). The synthetic image is an image that displays the change feature between the registered test image, template image, and differential image channels that comprise it.

According to at least one embodiment, the present invention may utilize a multi-scale defect detection network. The multi-scale defect detection network may take as its input the synthetic image. Because the synthetic image includes the differential image this may help train and improve the multi-scale defect detection network over time. Training the multi-scale defect detection network may help increase flexibility and generalization which may allow better adoption of new template images.

According to at least one embodiment, the multi-scale defect detection network may generate a defect map. The defect map may be generated by supervised learning. The defect map may show the defect areas and defect codes.

According to at least one embodiment, the present invention may generate a defect map that indicates the defect area on the synthetic image and the defect code illustrated in a specific color.

Figure 1:
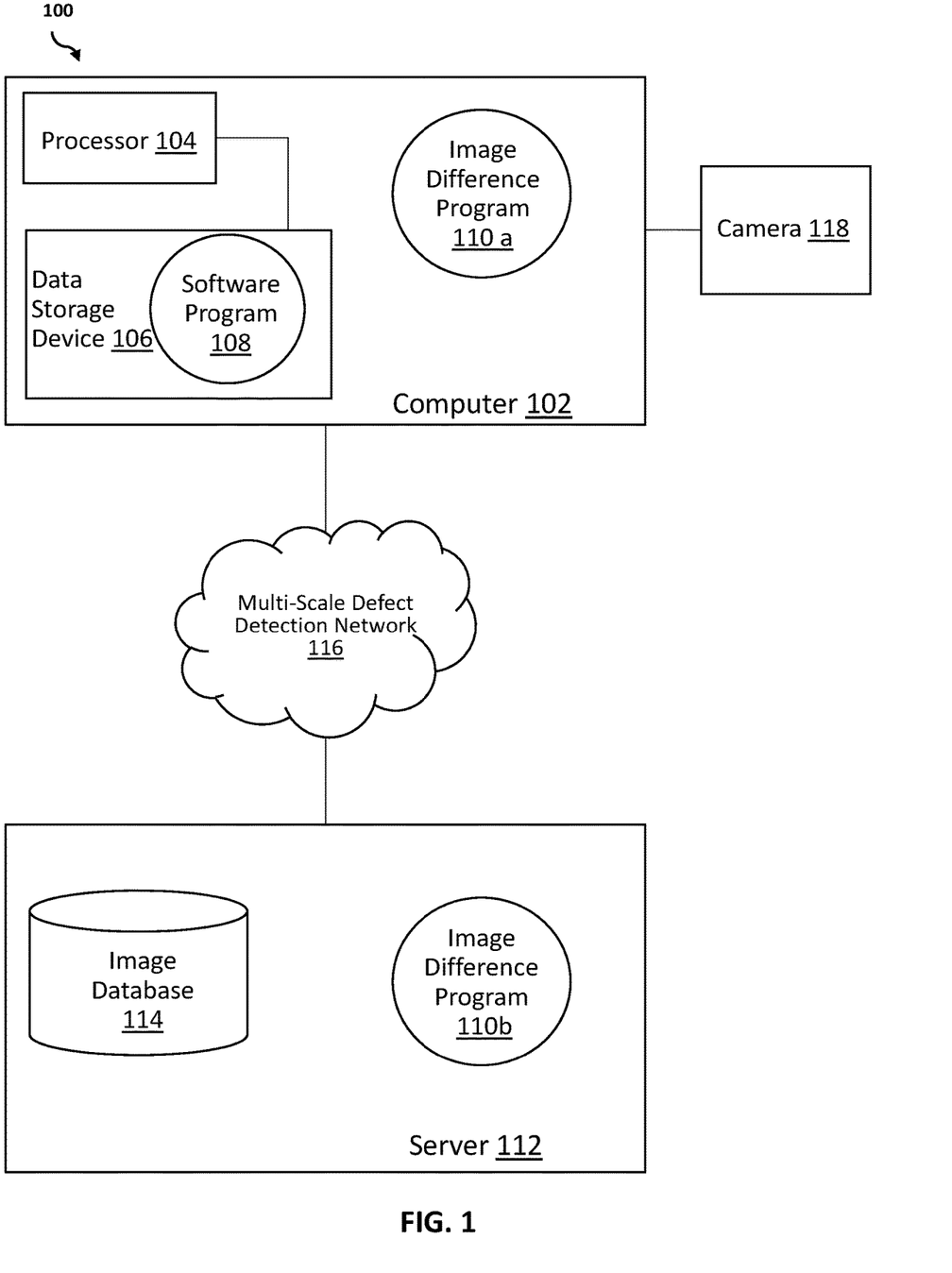
FIG. 1 illustrates a networked computer environment according to at least one embodiment.

Referring to FIG. 1, a networked computer environment 100 in accordance with one embodiment is depicted. The networked computer environment 100 may include a computer 102 with a processor 104 and a data storage device 106 that is enabled to run a software program 108 and an image difference program 110a. The networked computer environment 100 may also include a server 112 that is enabled to run an image difference program 110b that may interact with an image database 114 and a multi-scale defect detection network 116. The networked computer environment 100 may include a plurality of computers 102 and servers 112, only one of which is shown. The multi-scale defect detection network 116 may include various types of communication networks, such as a wide area network (WAN), local area network (LAN), a telecommunication network, a wireless network, a public switched network and/or a satellite network. The camera 118 is depicted as its own separate entity but could be part of any other part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the multi-scale defect detection network 116. The multi-scale defect detection network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing an image database 114. According to various implementations of the present embodiment, the image difference program 110a, 110b (referred to collectively as 110) may interact with an image database 114 that may be embedded in various storage devices, such as, but not limited to a computer/mobile device 102, a networked server 112, or a cloud storage service.

According to the present embodiment, a user using a client computer 102 or a server computer 112 may use the image difference program 110a, 110b (respectively) to map the test image over the template image, generate a registered test image, perform an image difference analysis between the registered test image and template image, determine differences between the registered test image and template image, generate a differential image, synthesize the registered test image, differential image, and template image, and generate the synthetic image for input into multi-scale defect detection network. The image difference method is explained in more detail below with respect to FIGS. 2A and 2B (hereinafter referred to as FIG. 2).

Figure 2A:
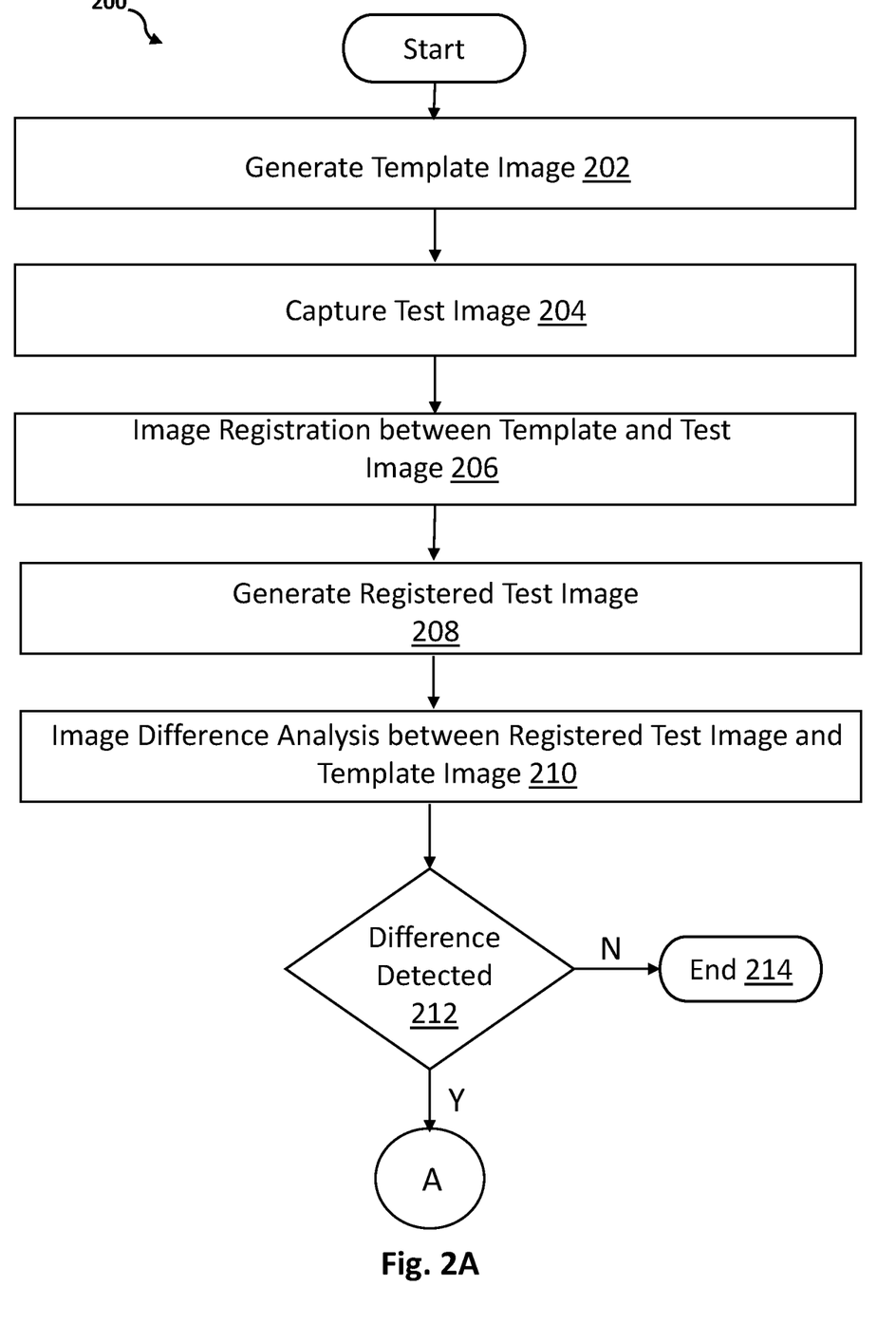
FIGS. 2A and 2B are an operational flowchart illustrating a process for analyzing visual defects according to at least one embodiment.
Figure 2B:
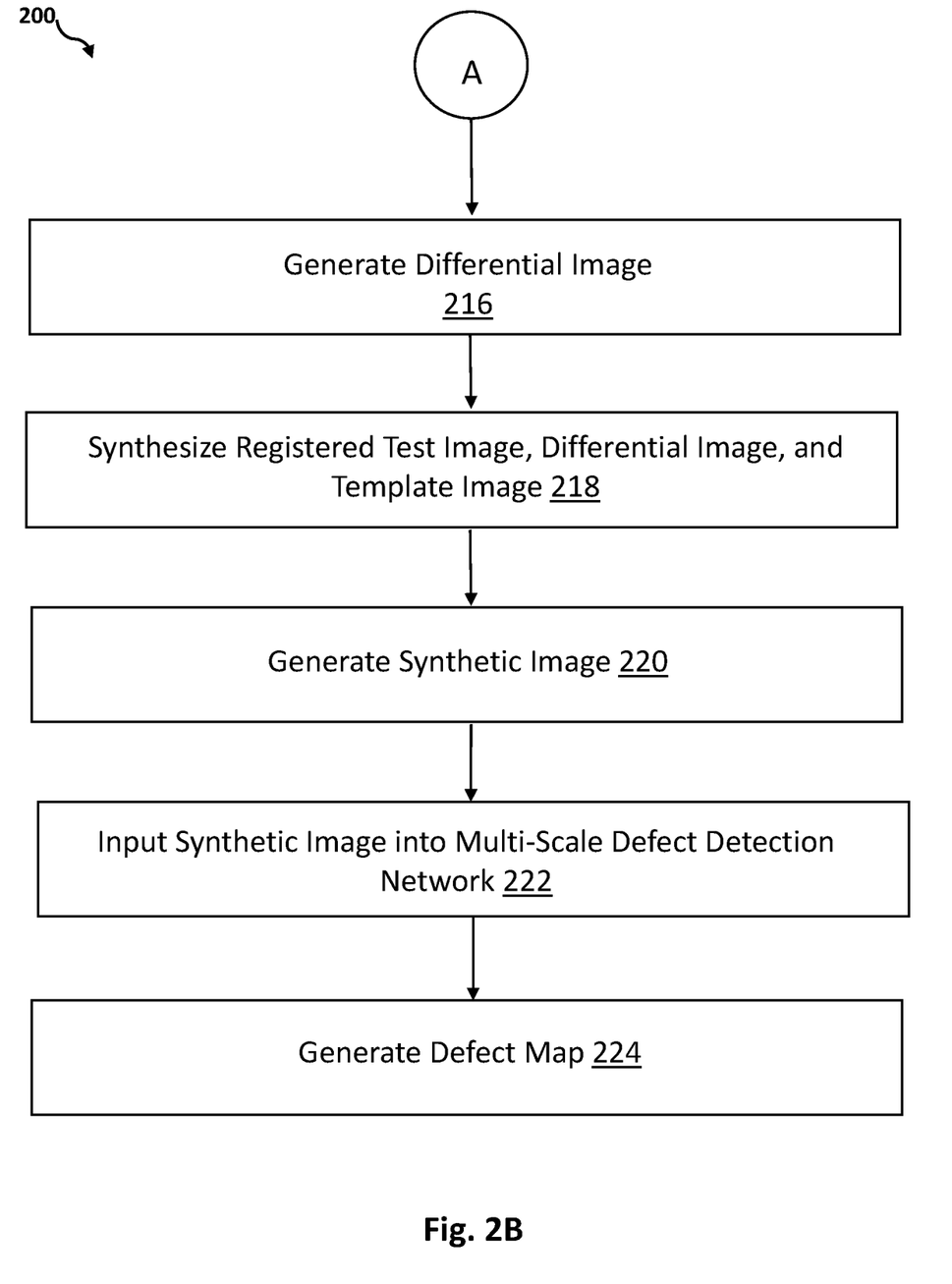

Referring now to FIG. 2, an operational flowchart illustrating an example of the image difference process 200 used by the image difference program 110a and 110b (referred to collectively as image difference program 110) according to at least one embodiment is depicted.

At 202, the image difference program 110 may generate a template image. The template image is an image free from defects and the standard by which all product labels are compared.

At 204, the image difference program 110 may capture a test image. The test image is the label on the product, packaging or container being examined. The test image may be defective.

A camera 118 may capture the test image. The test image may be orientated in a different manner than template image.

At 206, the image difference program 110 may perform an image registration between the test image and the template image. The image difference program 110 may determine a number of feature points in the test image. The image difference program 110 may determine a number of feature points in the template image. A feature point may be an unusual image region (e.g., image region with unique characteristics) with a well-defined position, which may be invariant to transformations (e.g., geometric transformations, photometric transformations). The image difference program 110 may determine feature descriptors for feature points in the test image. The image difference program 110 may determine feature descriptors for feature points in the template image. A feature descriptor may be the intensity information in a region around a detected feature point (e.g., a square window of pixels). The image difference program 110 may determine matching pairs of feature points between the test image and template image. Matching pairs of feature points may be inaccurate and contain outliers (e.g., similar features throughout an image, occlusions, noise, ambiguity, wrong feature extraction). The image difference program 110 may use a method to determine accurate matching pairs of feature points between the test image and template image. Accurate matching pairs of feature points are the matching pairs of feature points minus inaccurately matched feature points (e.g., outliers). The image difference program 110 may use a robust probabilistic method to determine accurate matching pairs of feature points between the test image and template image. The image difference program 110 may use the accurate matching pairs of feature points to generate a homography matrix. The homography matrix may be a mapping relating perspective images of the same scene. The homography matrix may represent the transformation relationship between the test image and template image. The image difference program 110 may use the homography matrix to map the test image to the template image.

The image difference program 110 may determine a number of feature points (e.g., interest points, key points) in the test image. The image difference program 110 may determine a number of feature points in the template image. Feature points may be invariant to geometric transformations (e.g., translation, rotation) and photometric transformation (e.g., brightness, exposure). Features may be detected in the form of corners, blobs, edges, junctions, lines etc. The image difference program 110 may use corner features as feature points in the test image. The image difference program 110 may use corner features as feature points in the template image. A corner feature is a distinctive image location which has a well-defined position and can be readily determined because of its local variation in two directions. A corner feature may be an image location which has large intensity changes in more than one direction (e.g., shifting a pixel window in any direction may give a large change in intensity). A corner feature may be invariant to geometric transformations between two images. A corner feature may be referred to interchangeably with other terms, such as, for example, distinct features, corner, interest point, feature.

The image difference program 110 may determine feature descriptors for feature points in the test image. The image difference program 110 may determine feature descriptors for feature points in the template image. The image difference program 110 may use an algorithm to determine feature descriptors for feature points in the test image. The image difference program 110 may use an algorithm to determine feature descriptors for feature points in the template image. Feature descriptors may be unique patterns possessed by neighboring pixels of feature points. Feature descriptors may assign distinctive identities to feature points which may enable their effective recognition for matching. The image difference program 110 may use a feature description algorithm (e.g., SIFT, SURF, KAZE, AKAZE, ORB, BRISK) to determine feature descriptors for feature points. The image difference program 110 may use a gradient feature as the feature descriptor for feature points in the test image. The image difference program 110 may use a gradient feature as the feature descriptor for feature points in the template image. A gradient feature is a directional change (e.g., gradient in the x direction, gradient in the y direction) in the intensity or color of an image. A gradient feature may capture the intensity information in a region (e.g., square window of pixels) around a feature point. A gradient feature may be invariant to photometric transformations between two images. A gradient feature may have various uses, such as, for example, feature matching, texture matching, intensity matching, color matching.

The image difference program 110 may determine matching pairs of feature points between the test image and template image. The image difference program 110 may use matching strategies to determine matching pairs of feature points between the test image and the template image. Matching strategies (e.g., L1-norm, L2-norm, Hamming distance, Nearest Neighbor, Nearest Distance Ratio) may not completely avoid incorrect matches (e.g., outliers) of feature points between the test image and the template image. Matching pairs of feature points may be inaccurate and contain outliers (e.g., similar features throughout an image, occlusions, noise, ambiguity, wrong feature extraction).

The image difference program 110 may use a method to determine accurate matching pairs of feature points between the test image and template image. Accurate matching pairs of feature points are the matching pairs of feature points minus inaccurately matched feature points (e.g., outliers). The image difference program 110 may use a robust probabilistic method (e.g., Random Sample Consensus ("RANSAC"), M-estimator Sample Consensus ("MSAC"), Progressive Sample Consensus ("PROSAC") for removing outliers from matched feature points and fitting a transformation function (e.g., in terms of a homography matrix). The image difference program 110 may use a RANSAC method to determine accurate matching pairs of feature points between the test image and template image. RANSAC is a method to estimate parameters of a model by random sampling of data (e.g., matching pairs of feature points) that may contain outliers (e.g., inaccurately matched feature points), when outliers are to be accorded no influence on the values of the estimates. RANSAC may be interpreted as an outlier detection method.

The image difference program may use RANSAC to determine accurate matching pairs of feature points between the test image and template image. RANSAC may remove outliers from the matching pairs of feature points to determine the accurate matching pair of feature points. An advantage of RANSAC is the method's ability to do robust estimation of model parameters, i.e., RANSAC can estimate the parameters with a high degree of accuracy even when a significant number of outliers (e.g., inaccurately matched feature points) are present in the data set (e.g., matching pairs of feature points). Since the image difference program 110 may use corner features and gradient features to determine feature points and matching pairs of feature points (e.g., data set) RANSAC may determine accurate matching pairs of feature points quickly with a high degree of accuracy.

The image difference program 110 may use the accurate matching pairs of feature points determined by RANSAC to generate a homography matrix. Since a camera 118 may capture the test image, the test image may be orientated in a different manner compared to the template image. The homography matrix may represent the transformation relationship between the test image and template image. Knowing a correspondence between a number of accurate matching pairs of feature points in the test image and template image, a transformation is then determined to map the test image to the template image, thereby establishing point-by-point correspondence between the template and test image.

The image difference program 110 may use the homography matrix to map the test image to the template image. Mapping the test image to the template image may orientate the test image in a manner similar to the template image. Aligning the test image with the template image may reduce false defect detections.

At 208, the image difference program 110 may generate a registered test image. The registered test image is the test image orientated in a manner similar to (e.g., aligned) the template image. Each pixel of the registered test image may have a corresponding pixel in the template image.

At 210, the image difference program 110 may perform an image difference analysis between the registered test image and the template image. The image difference analysis may determine an absolute difference value for each corresponding pair of pixels between the registered test image and the template image. Each pixel may have a pixel value (e.g., brightness of a pixel represented by a single integer from 0 to 9). The image difference analysis may determine the absolute difference for each corresponding pair of pixels (e.g., the difference between 3 and 3 is 0, 2 and 3 is 0, 4 and 1 is 3, 7 and 8 is 1).

Image difference analyses may be considered unreliable due to the effects of noise and contextual factors such as, for example, changes in lighting, color, viewing direction, size or shape. The image difference analysis between the registered test image and template image may be considered more reliable due to using the registered test image (e.g., test image registration aligned the test image similar to the template image).

At 212, the image difference program 110 determines whether there are any meaningful differences between the registered test image and template image. If there is no meaningful difference between the images, proceed to step 214. If there is a meaningful difference between the images, proceed to step 216. A meaningful difference is an absolute difference value of the difference between corresponding pairs of pixels (e.g., absolute difference) above a predetermined threshold (e.g., absolute difference value due to contextual factors, absolute difference value due to noise). A predetermined threshold may be an absolute difference value higher than zero (e.g., corresponding pixels are not identical, 3 and 2 is 1, 1 may not be considered a meaningful difference, 8 and 4 is 4, 4 may be considered a meaningful difference).

At 214, if there is no meaningful difference between the registered test image and the template image, the image difference analysis is complete. No meaningful difference may indicate that the registered test image and template image were a perfect match (e.g., absolute difference value of corresponding pixels of 0, identical images) or it may indicate that the images were a perfect match considering contextual factors (e.g., changes in lighting, color, viewing direction, size or shape). The label on the container, packing, or product (e.g., test image) is acceptable.

At 216, if there is a meaningful difference between the registered test image and the template image, the image difference program 110 may generate a differential image. A meaningful difference is an absolute difference value above a pre-determined threshold. The differential image demonstrates a change feature (e.g., mapping of absolute difference values for each corresponding pixel between the registered test image and the template image) between the registered test image and template image. The change feature may include meaningful differences and absolute difference values below the predetermined threshold. The differential image may include noise (e.g., undesirable by-product of captured test image that obscures the label). The differential image may include contextual factor information. The differential image may be used to train the multi-scale defect detection network 116.

At 218, the image difference program 110 may synthesize the registered test image, differential image, and template image.

At 220, the image difference program 110 may generate a synthetic image. The synthetic image may be a multi-layer image, the layers may be a registered test image layer, a differential image layer, and a template image layer.

At 222, the image difference program 110 may input the synthetic image into a multi-scale defect detection network. The multi-scale defect detection network may use absolute difference values (e.g., absolute value of the difference between each corresponding pair of pixels of the registered test image and the template image) in the differential image layer of the synthetic image to determine all defects (e.g., defects, noise, contextual factors). The multi-scale defect detection network may use the registered test image layer and the template image layer to determine defects. The multi-scale defect detection network may use the registered test image later and the template image layer to determine noise. The multi-scale defect detection network may use absolute difference values to learn the differences between defects and noise. The multi-scale defect detection network may use the change feature of the differential image layer to increase speed of convergence. The multi-scale defect detection network may have encoder parts. The encoder parts of the multi-scale defect detection network may extract image features. The multi-scale defect detection network may have decoder parts. The decoder parts of the multi-scale defect detection network may use image features to generate a defect map. The multi-scale defect detection network may use the registered test image layer to generate the defect map. The multi-scale defect detection network may determine a defect location using pixel locations of the registered test image. The multi-scale defect detection network may determine defect types, such as, for example, scratches, oil stains, misprints, incorrect font, etc. The multi-scale defect detection network may determine defect values (e.g., scratches are 1, oil stains are 2, misprints are 3, incorrect fonts are 4).

The multi-scale defect detection network may be a convolutional neural network ("CNN"). A CNN is a type of deep neural network using successive operations across a variety of layers, which may be trained to deal with two-dimensional images. Convolution allows the network to learn increasingly complex features at each layer. A CNN may include an input and output layer, as well as multiple hidden layers. Convolutional layers may convolve the synthetic image (e.g., input) and pass results to the next layer. The CNN structure is typically made up of two main stages, i.e., feature extraction and classification while it is learned to describe spatial information of the images across the layers. There are conventionally three different types of layers in the CNN architecture, i.e., convolutional, pooling and fully-connected layer (e.g., classification). The CNN may combine features from the convolutional, pooling and fully-connected layers to generate a defect map. A defect map may be used for precise defect detection.

At 224, the image difference program 110 may generate a defect map. The image difference program 110 may use the registered test image to generate a defect map. The image difference program 110 may use pixel locations (e.g., x-coordinate, y-coordinate) of the registered test image to determine defect locations. The image difference program 110 may use weighted cross entropy ("WCE") loss function for pixel classification. The defect map may include defect values. Defect values may have a corresponding defect type (e.g., scratches are 1, oil stains are 2, misprints are 3, incorrect fonts are 4).

It may be appreciated that FIGS. 2A and 2B (collectively referred to as FIG. 2) provide only an illustration of one embodiment and do not imply any limitations with regard to how different embodiments may be implemented. Many modifications to the depicted embodiment(s) may be made based on design and implementation requirements.

Figure 3:
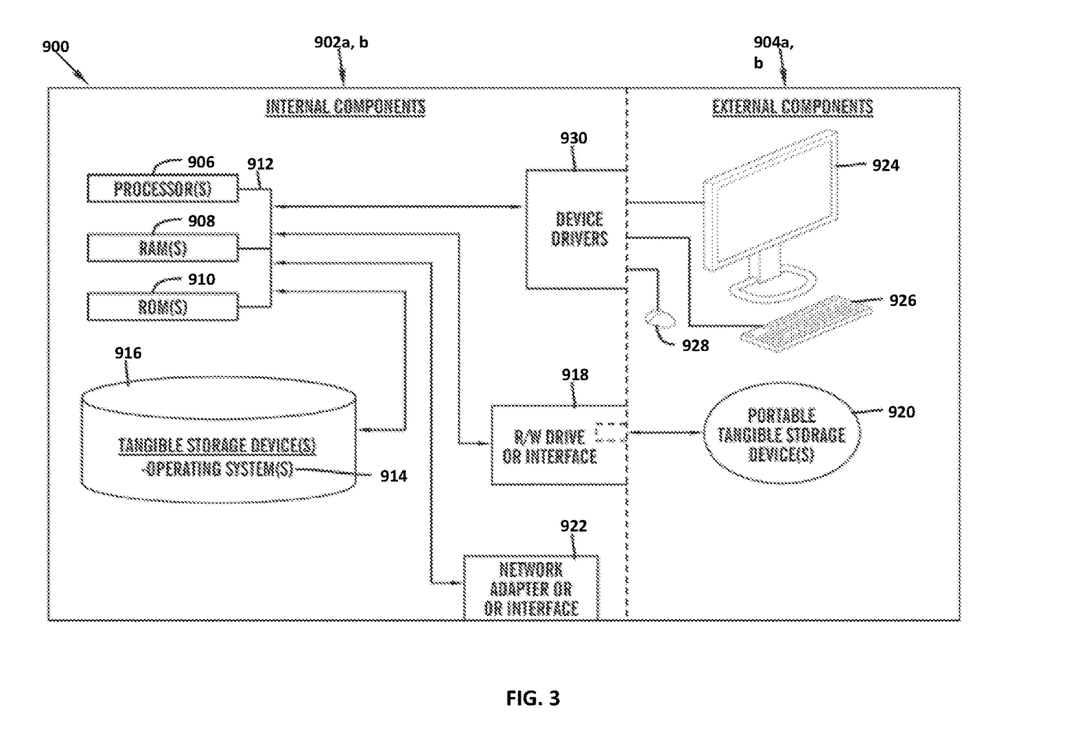
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the image difference program 110a in client computer 102, and the image difference program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the image difference program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the image difference program 110a in client computer 102 and the image difference program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the image difference program 110a in client computer 102 and the image difference program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
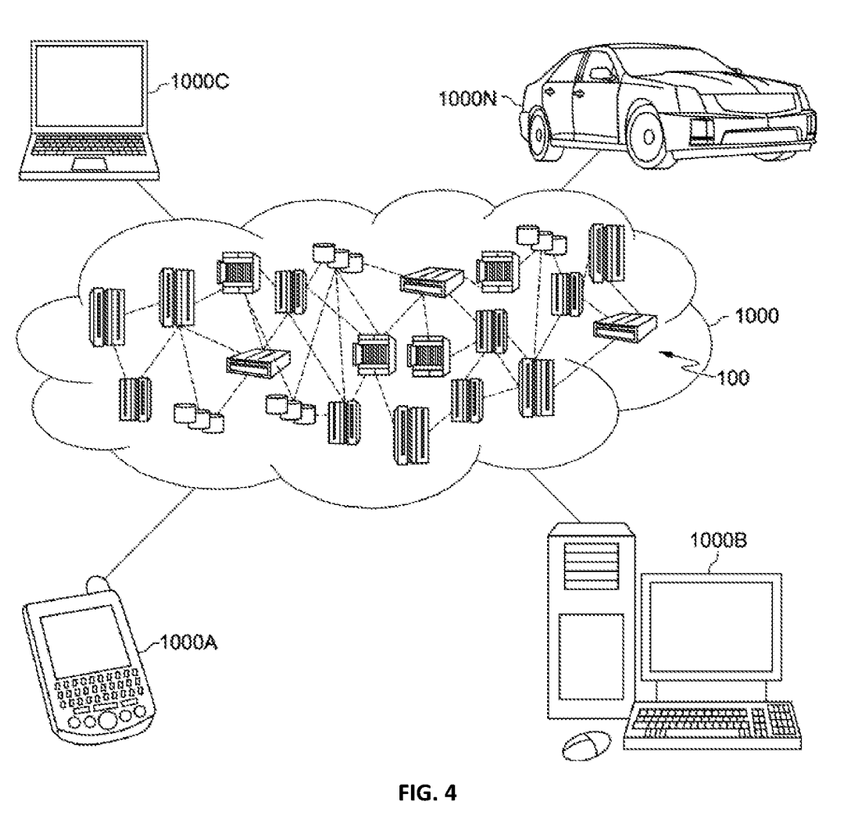
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
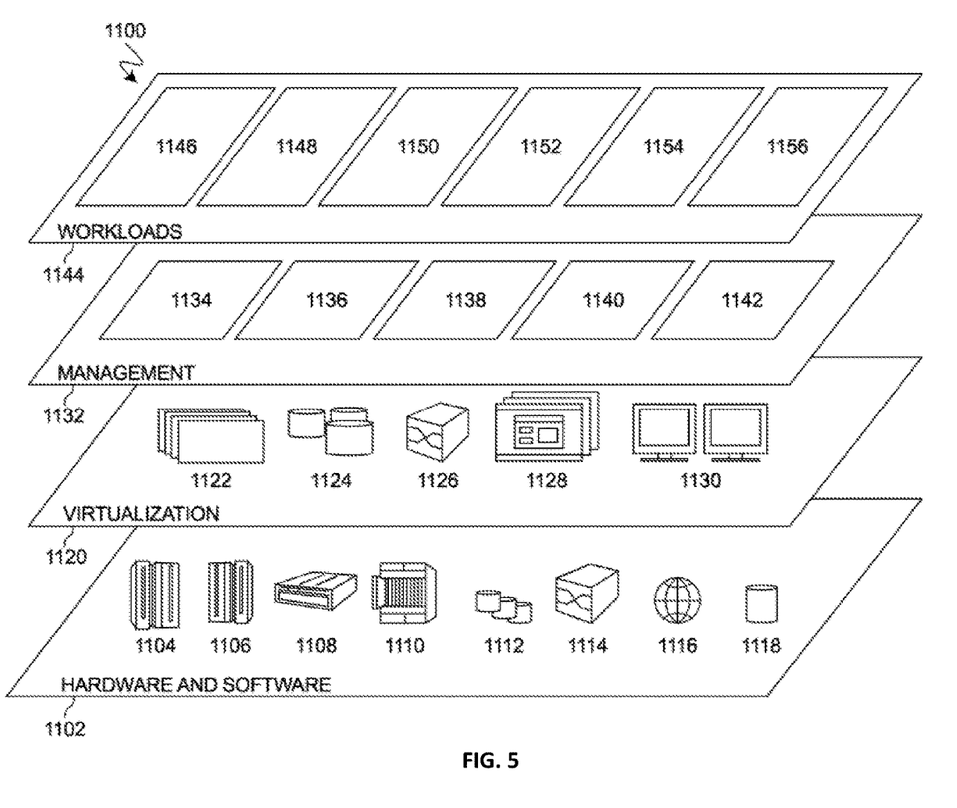
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and analyze image differences 1156. An image difference program 110a, 110b provides a way to effectively map and identify defects in test images based off image registration and image comparisons determined by the image difference program 110a, 110b.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for analyzing visual defects, the method comprising:
    performing an image difference analysis between a registered test image and a template image, wherein the image difference analysis comprises determining a meaningful difference between the registered test image and the template image;
    generating a differential image, wherein the differential image comprises a change feature between the registered test image and the template image;
    generating a synthetic image, wherein the synthetic image comprises three layers, wherein the three layers are the differential image, the registered test image, and the template image;
    generating a defect map based on the synthetic image; and
    displaying the defect map, wherein the defect map includes pixel locations and defect codes for each of the one or more defects, the pixel locations corresponding to a defect area of the registered test image and the defect codes having a corresponding defect type.

2. The method of claim 1, wherein the registered test image is a test image orientated in a manner similar to the template image.

3. The method of claim 1, wherein performing the image difference analysis further comprises:
    mapping a test image to the template image using a number of feature points, wherein the feature points comprise corner features, wherein corner features comprise feature descriptors, wherein feature descriptors comprise gradient features, and wherein an image difference program determines matching pairs of feature points and feature descriptors.

4. The method of claim 3, further comprising:
    finding accurate matching pairs of feature points between the test image and the template image, wherein accurate matching pairs of feature points comprises feature points determined using a robust probabilistic method; and
    utilizing the accurate matching pairs of feature points to create a homography matrix, wherein the homography matrix represents a transformation relationship between the test image and template image, wherein the transformation is then determined to orientate the test image in a manner consistent with the template image.

5. The method of claim 4, wherein the robust probabilistic method is a random sample consensus ("RANSAC") method.

6. The method of claim 1, wherein generating the differential image further comprises:
    determining an absolute differences value between each corresponding pair of pixels between the registered test image and the template image, wherein the meaningful difference is an absolute difference value of the difference between corresponding pairs of pixels above a predetermined threshold, and wherein the change feature comprises a mapping of the meaningful differences and absolute value differences below the predetermined threshold.

7. The method of claim 1, wherein generating the defect map using the synthetic image, further comprises:
    inputting the synthetic image into a multi-scale defect detection network, wherein the multi-scale defect detection network is a convolutional neural network ("CNN"), wherein the CNN utilizes the differential image channel to train identifying the meaningful difference, and
    using the synthetic image to extract and classify features.

8. The method of claim 1, wherein generating the defect map based on the synthetic image, further comprises:
    identifying the defect areas for each of the one or more defects, wherein the defect areas are identified in an x,y coordinate plane overlayed on the registered test image; and
    determining a defect code, representative of a defect type, for each of the one or more defects, wherein the defect code is displayed within the defect map at a location on the x, y coordinate plane.

9. A computer system for analyzing visual defects, comprising:
    one or more processors, one or more computer-readable memories, one or more computer-readable tangible storage medium, and program instructions stored in at least one of the one or more tangible storage medium for execution by at least one of the one or more processors via at least one of the one or more memories, wherein in the computer system is capable of performing a method comprising:
        performing an image difference analysis between a registered test image and a template image, wherein the image difference analysis comprises determining a meaningful difference between the registered test image and the template image;
        generating a differential image, wherein the differential image comprises a change feature between the registered test image and the template image;
        generating a synthetic image, wherein the synthetic image comprises three layers, wherein the three layers are the differential image, the registered test image, and the template image;
        generating a defect map based on the synthetic image; and
        displaying the defect map, wherein the defect map includes pixel locations and defect codes for each of the one or more defects, the pixel locations corresponding to a defect area of the registered test image and the defect codes having a corresponding defect type.

10. The computer of system of claim 9, wherein performing the image difference analysis further comprises:
- mapping a test image to the template image using a number of feature points, wherein the feature points comprise corner features, wherein corner features comprise feature descriptors, wherein feature descriptors comprise gradient features, and wherein an image difference program determines matching pairs of feature points and feature descriptors.

11. The computer system of claim 10, further comprising:
- finding accurate matching pairs of feature points between the test image and the template image, wherein accurate matching pairs of feature points comprises feature points determined using a robust probabilistic method; and
- utilizing the accurate matching pairs of feature points to create a homography matrix, wherein the homography matrix represents a transformation relationship between the test image and template image, wherein the transformation is then determined to orientate the test image in a manner consistent with the template image.

12. The computer system of claim 9, wherein generating the differential image further comprises:
- determining an absolute differences value between each corresponding pair of pixels between the registered test image and the template image, wherein the meaningful difference is an absolute difference value of the difference between corresponding pairs of pixels above a predetermined threshold, and wherein the change feature comprises a mapping of the meaningful differences and absolute value differences below the predetermined threshold.

13. The computer system of claim 9, wherein generating the defect map using the synthetic image, further comprises:
- inputting the synthetic image into a multi-scale defect detection network, wherein the multi-scale defect detection network is a convolutional neural network ("CNN"), wherein the CNN utilizes the differential image channel to train identifying the meaningful difference, and
- using the synthetic image to extract and classify features.

14. The computer system of claim 9, wherein generating the defect map based on the synthetic image, further comprises:
- identifying the defect areas for each of the one or more defects, wherein the defect areas are identified in an x,y coordinate plane overlayed on the registered test image; and
- determining a defect code, representative of a defect type, for each of the one or more defects, wherein the defect code is displayed within the defect map at a location on the x, y coordinate plane.

15. A computer program product for analyzing visual defects, comprising
- one or more non-transitory computer-readable storage media and program instructions stored on at least one of the one or more tangible storage media, the program instructions executable by a processor to cause the processor to perform a method comprising:
  - performing an image difference analysis between a registered test image and a template image, wherein the image difference analysis comprises determining a meaningful difference between the registered test image and the template image;
  - generating a differential image, wherein the differential image comprises a change feature between the registered test image and the template image;
  - generating a synthetic image, wherein the synthetic image comprises three layers, wherein the three layers are the differential image, the registered test image, and the template image;
  - generating a defect map based on the synthetic image; and
  - displaying the defect map, wherein the defect map includes pixel locations and defect codes for each of the one or more defects, the pixel locations corresponding to a defect area of the registered test image and the defect codes having a corresponding defect type.

16. The computer program product of claim 15, wherein performing the image difference analysis further comprises:
- mapping a test image to the template image using a number of feature points, wherein the feature points comprise corner features, wherein corner features comprise feature descriptors, wherein feature descriptors comprise gradient features, and wherein an image difference program determines matching pairs of feature points and feature descriptors.

17. The computer program product of claim 16, further comprising:
- finding accurate matching pairs of feature points between the test image and the template image, wherein accurate matching pairs of feature points comprises feature points determined using a robust probabilistic method; and
- utilizing the accurate matching pairs of feature points to create a homography matrix, wherein the homography matrix represents a transformation relationship between the test image and template image, wherein the transformation is then determined to orientate the test image in a manner consistent with the template image.

18. The computer program product of claim 15, wherein generating the differential image further comprises:
- determining an absolute differences value between each corresponding pair of pixels between the registered test image and the template image, wherein the meaningful difference is an absolute difference value of the difference between corresponding pairs of pixels above a predetermined threshold, and wherein the change feature comprises a mapping of the meaningful differences and absolute value differences below the predetermined threshold.

19. The computer program product of claim 15, wherein generating the defect map using the synthetic image, further comprises:
- inputting the synthetic image into a multi-scale defect detection network, wherein the multi-scale defect detection network is a convolutional neural network ("CNN"), wherein the CNN utilizes the differential image channel to train identifying the meaningful difference, and using the synthetic image to extract and classify features.

\* \* \* \* \*